May 10, 1927.
H. S. ORR
1,628,182
APPARATUS FOR DETECTING AND EXTINGUISHING FIRES IN THE CARGO
SPACES OF VESSELS
Filed Sept. 22, 1926
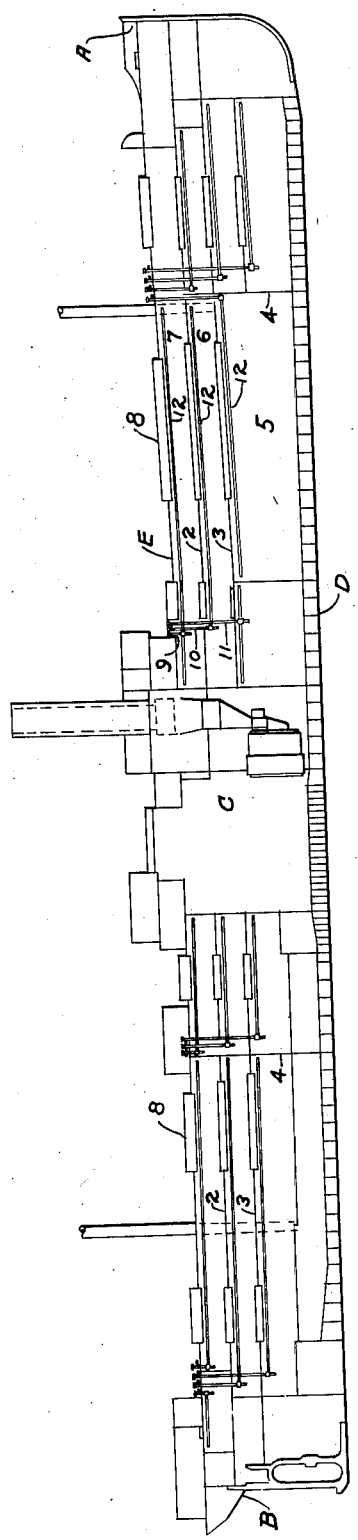
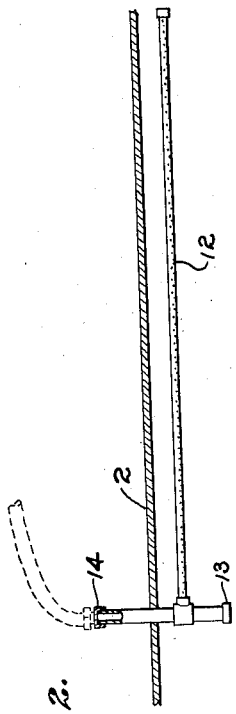
INVENTOR.
Harry S. Orr.
BY
Townsend, Loftus & Abbett
ATTORNEYS.

Patented May 10, 1927.

1,628,182

UNITED STATES PATENT OFFICE.

HARRY S. ORR, OF ALAMEDA, CALIFORNIA.

APPARATUS FOR DETECTING AND EXTINGUISHING FIRES IN THE CARGO SPACES OF VESSELS.

Application filed September 22, 1926. Serial No. 136,952.

This invention relates to an apparatus for detecting and extinguishing fires in the cargo spaces of vessels.

Fire is the most dreaded of marine hazards and is the only sea casualty which is on the increase. Experience has demonstrated that most fires originate below the superstructure of a ship and usually in the cargo compartments which are difficult if not almost impossible of access. A number of piping systems have been employed, whereby water or some other fire extinguishing medium may be delivered to the several compartments or cargo spaces of the ship, but in spite thereof, fire damage is on the increase, as a fire in a remote or inaccessible compartment is usually not discovered until it has gained considerable headway, when it is often beyond control.

The object of the present invention is to generally improve and simplify the arrangement and operation of fire extinguishing piping systems and particularly to provide a piping system which will not only serve as a conduit for the fire extinguishing medium such as water, steam or otherwise, but also that of a conduit system through which temperature readings or records may be obtained of each and every compartment, thus permitting detection of a fire when combustion begins.

One form which the invention may assume is shown by way of illustration in the accompanying drawing, in which Fig. 1 is a central vertical longitudinal section of a cargo ship.

Fig. 2 is an enlarged detail view of one of the stand pipes and branch connections 12.

By referring to this drawing, A indicates the bow of the ship, B the stern, C the engine and boiler room compartments, D the bottom section and E the upper deck. Cargo ships are usually provided with two or more 'tween decks, such as indicated at 2 and 3 and transverse bulkheads are also provided as indicated at 4, thereby dividing the ship into a number of water-tight cargo spaces or compartments such as indicated at 5, 6, 7, etc. Access to these cargo spaces is obtained through hatches such as indicated at 8 and if a fire should star, for instance, in the lower cargo space indicated at 5, it is obvious that it would be almost inaccessible, due to the fact that the hatches would be closed and furthermore, would be covered by the freight, in the spaces 5, 6 and 7, etc.

The purpose of the present invention is to provide a piping system whereby any compartment may be flooded with water or smothered with steam or some other fire extinguishing medium and further to provide a piping system whereby the temperature of each cargo compartment may be determined from time to time. This is accomplished as follows:—

Extending from the upper deck are a number of pipes such as indicated at 9, 10 and 11. The pipe 9 extends from the upper deck into the cargo space 7, the pipe 10 extends from the upper deck through the cargo compartment 7 and into the cargo compartment 6 and the pipe 11 extends from the upper deck through the cargo compartments 7 and 6 and into the lowermost compartment indicated at 5. These pipes are vertically disposed. The lower ends of the pipes are provided with perforated branch pipes, as indicated at 12 and the lowermost end of each pipe is slightly extended beyond the branch pipes and are capped as indicated at 13. The capped lowermost extension of each pipe serves as a temperature reading compartment and will hereinafter be further explained.

The upper ends of the pipes are threaded or provided with fittings of a suitable nature to permit introduction of water, steam or the like from the boilers or any other suitable fire extinguishing medium, that is, a hose or pipe connection is made with the upper end of each pipe to permit introduction of whatever fire extinguishing medium may be desired, for instance, a pipe might be connected with bottles containing carbon dioxide gas or with tanks containing carbon tetrochloride in liquid form. The fire extinguishing medium whatever it may be flows downwardly through the pipes 9, 10 and 11 or whatever the case may be and then discharges through the perforated branch pipes 12 directly above the cargo, thus insuring a uniform distribution of the fire extinguishing medium in the cargo compartment where a fire would originate.

When the pipes 9, 10 and 11 are not in use, an ordinary screw cap 14 is placed on the upper end of each pipe. When a ship is at sea or in normal operation, temperature readings of each and every compartment is taken once every three hours or whatever the case may be, by some officer or member of the crew who may be designated for that duty. For instance, it may be the ship's carpenter's duty to take a temperature reading every so often and to give the readings to the officer in charge. The readings are taken in the following manner:

The ship's carpenter employs an ordinary thermometer which is attached to the end of a flexible line. To determine the temperature of a cargo compartment he removes the screw cap 14 of the pipe leading to that compartment. He then lowers the thermometer down through the pipe until it rests in the lower end indicated at 13. He leaves the thermometer there for a sufficient length of time to obtain the temperature. If there is no fire in the compartment the thermometer when removed, will show a normal temperature, for instance, of 65° F. On the other hand if a fire has just started, the temperature in the compartment will probably be 80 more degrees and the thermometer when removed, will show this temperature increase. A report is immediately made to the officer in charge and temperature readings are taken at short intervals to determine if there is an actual fire. If the temperature gradually increases it is a sure indication that combustion has started and the pipe is then connected with the fire extinguishing medium, which is then introduced as has been previously described.

The fire is thus detected and extinguished as soon as started and the danger of a fire gaining any headway is practically eliminated. The most inaccessible cargo spaces or compartments are thus under full control and fire hazard is materially reduced.

Having thus described my invention, what I claim and desire to secure by Letters Patent is:—

1. The combination with the cargo compartments and the deck of a vessel, of a plurality of pipes extending from the deck to the compartments, one pipe to each compartment, said pipes being substantially vertically disposed and their lower ends terminating in the upper portions of the compartments, a spray pipe horizontally disposed and connected to the lower end of each pipe, and an extension on the first named pipe below the spray connection, for the reception of a thermometer to permit the temperature readings to be taken in each compartment.

2. The combination with the cargo compartments and the deck of a vessel, of a plurality of pipes extending from the deck to the compartments, one pipe to each compartment, said pipes being substantially vertically disposed and their lower ends terminating in the upper portions of the compartments, a spray pipe horizontally disposed and connected to the lower end of each pipe, an extension on the first named pipe below the spray connection, for the reception of a thermometer to permit the temperature readings to be taken in each compartment, and a connection on the upper end of each first-named pipe to receive a closure cap and also adapted to receive conduits which are connected with a fire extinguishing medium.

HARRY S. ORR.